(12) United States Patent
Onuki

(10) Patent No.: US 11,390,330 B2
(45) Date of Patent: Jul. 19, 2022

(54) VEHICLE EXTERIOR COMPONENT AND ATTACHMENT STRUCTURE FOR THE SAME

(71) Applicant: FALTEC Co., Ltd., Kawasaki (JP)

(72) Inventor: Soji Onuki, Kanagawa-ken (JP)

(73) Assignee: FALTEC Co., Ltd., Kawasaki (JP)

( * ) Notice: Subject to any disclaimer, the term of this patent is extended or adjusted under 35 U.S.C. 154(b) by 390 days.

(21) Appl. No.: 16/497,582

(22) PCT Filed: Mar. 8, 2018

(86) PCT No.: PCT/JP2018/008959
§ 371 (c)(1),
(2) Date: Sep. 25, 2019

(87) PCT Pub. No.: WO2018/180336
PCT Pub. Date: Oct. 4, 2018

(65) Prior Publication Data
US 2021/0276629 A1    Sep. 9, 2021

(30) Foreign Application Priority Data

Mar. 30, 2017 (JP) .............................. JP2017-067835

(51) Int. Cl.
*B62D 27/02* (2006.01)
*B60R 9/04* (2006.01)

(52) U.S. Cl.
CPC ................ *B62D 27/02* (2013.01); *B60R 9/04* (2013.01)

(58) Field of Classification Search
CPC ........... B60R 9/04; B60R 9/052; B60R 9/058; B60R 11/00; B60R 2011/0042;
(Continued)

(56) References Cited

U.S. PATENT DOCUMENTS 5,377,889 A * 1/1995 Sumino ..................... B60R 9/12
224/309
6,250,528 B1   6/2001 Lumpe et al.
(Continued)

FOREIGN PATENT DOCUMENTS

JP    06-027352 U    4/1994
JP    11-278164 A    10/1999
(Continued)

OTHER PUBLICATIONS

International Search Report of PCT/JP2018/008959 dated May 1, 2018.
(Continued)

*Primary Examiner* — Corey N Skurdal
(74) *Attorney, Agent, or Firm* — Sughrue Mion, PLLC

(57) ABSTRACT

A vehicle exterior component includes: a main body having an elongated shape and attached to a vehicle body panel having vehicle body-side attachment portions; and attachment portions provided in the main body at intervals in a longitudinal direction of the main body. The attachment portions have attachment reference surfaces in contact with the vehicle body-side attachment portions at two or more combination positions each defined by a combination of one of lateral positions shifted from each other in a width direction of the main body and one of vertical positions shifted from each other in an attachment height direction of the main body to the vehicle body panel.

12 Claims, 16 Drawing Sheets

(58) Field of Classification Search
CPC ....... B60R 2011/005; B60R 2011/0052; B60R 2011/0059; B62D 27/02
See application file for complete search history.

(56) References Cited

U.S. PATENT DOCUMENTS

| | | | |
|---|---|---|---|
| 2003/0178458 A1* | 9/2003 | Trambley | B60R 9/04 224/326 |
| 2006/0049322 A1* | 3/2006 | Hirano | B60R 11/00 248/237 |
| 2011/0192870 A1 | 8/2011 | Michie et al. | |
| 2014/0117723 A1* | 5/2014 | Slack | B60R 13/04 296/213 |
| 2016/0297370 A1* | 10/2016 | Kim | B60R 9/04 |

FOREIGN PATENT DOCUMENTS

| | | |
|---|---|---|
| JP | 2001-158304 A | 6/2001 |
| JP | 2001-328492 A | 11/2001 |
| JP | 2003-276513 A | 10/2003 |
| JP | 2017067835 A | 4/2017 |

OTHER PUBLICATIONS

Communication dated Jul. 27, 2020, from the European Patent Office in European Application No. 18774683.9.

* cited by examiner

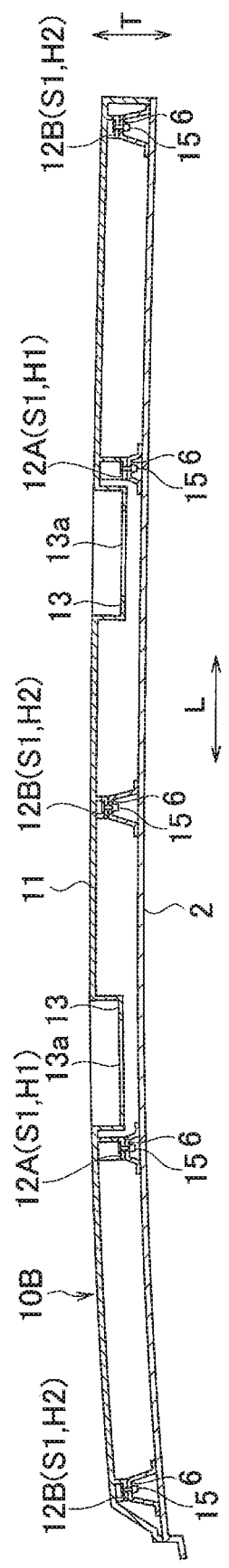

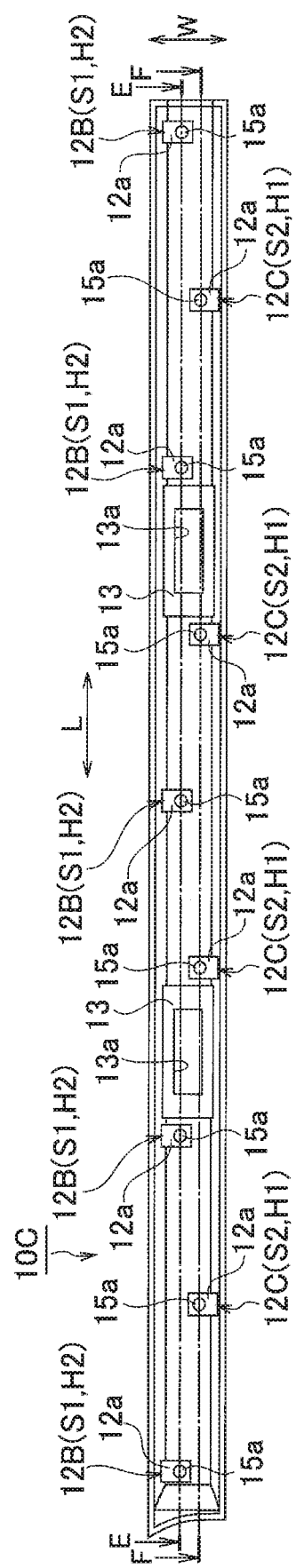

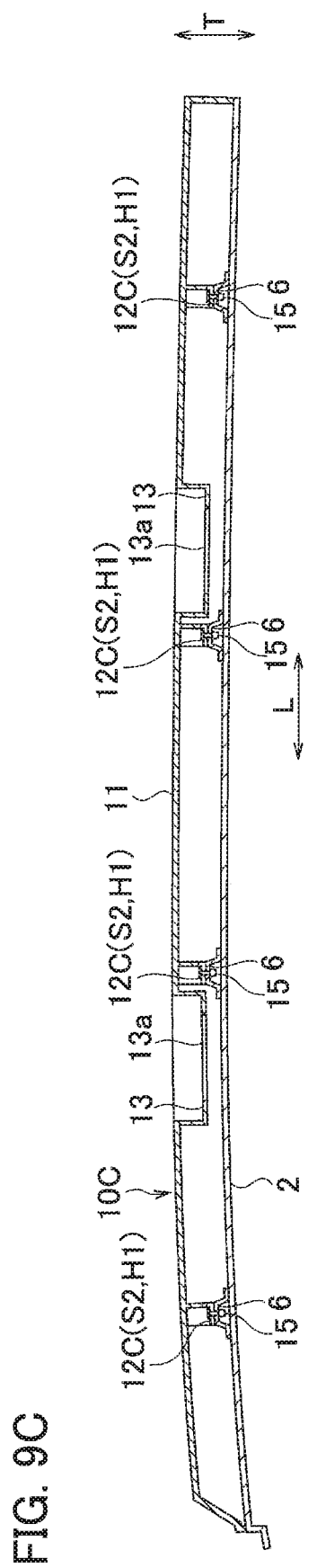

VEHICLE EXTERIOR COMPONENT AND ATTACHMENT STRUCTURE FOR THE SAME

CROSS REFERENCE TO RELATED APPLICATIONS

This application is a National Stage of International Application No. PCT/JP2018/008959 filed Mar. 8, 2018, claiming priority based on Japanese Patent Application No. 2017-067835 filed Mar. 30, 2017, the contents of all of which are incorporated herein by reference in their entirety.

TECHNICAL FIELD

The present invention relates to an elongated vehicle exterior component configured to be attached to a vehicle body and to an attachment structure for the same.

BACKGROUND ART

Vehicle exterior components are attached to a vehicle body for various purposes. For example, paired roof rails (vehicle exterior components) and cross bars are sometimes attached to a roof panel of the vehicle body. FIGS. 1 and 2 illustrate an attachment structure of related roof rails.

As illustrated in FIG. 1, multiple rail-side attachment portions 51 are provided on a back surface (bottom surface) side of an elongated roof rail 50 at intervals in the longitudinal direction. Clips 52 are fitted to the rail-side attachment portions 51. Note that only one clip 52 is illustrated in FIG. 1 to avoid complication.

As illustrated in FIG. 2, vehicle body-side attachment portions 61 are provided at positions corresponding to the respective rail-side attachment portions 51 on a roof panel 60 of the vehicle body. The vehicle body-side attachment portions 61 are provided by utilizing brackets 62.

The roof rail 50 is attached to the roof panel 60 by aligning the rail-side attachment portions 51 of the roof rail 50 with the vehicle body-side attachment portions 61 of the roof panel 60 and fitting the clips 52 to the vehicle body-side attachment portions 61.

CITATION LIST

Patent Literature

Patent Literature 1: Japanese Patent Application Publication No. 2001-328492

SUMMARY OF INVENTION

In the roof rail 50, as illustrated in FIGS. 1 and 2, the multiple rail-side attachment portions 51 provided at intervals in the longitudinal direction are arranged substantially linearly. Accordingly, when external force in the width direction W (direction orthogonal to the longitudinal direction) is applied to the roof rail 50, the roof rail 50 easily tilts about an imaginary center axis passing through the multiple rail-side attachment portions 51 linearly arranged. Easy tilting of the roof rail 50 causes loosening of the roof rail 50.

An object of the present invention is to provide a vehicle exterior component prevented from becoming loose against external force in a width direction as much as possible and an attachment structure for the same.

A vehicle exterior component in accordance with some embodiments of the present invention includes: a main body having an elongated shape and attached to a vehicle body panel having vehicle body-side attachment portions; and attachment portions provided in the main body at intervals in a longitudinal direction of the main body. The attachment portions have attachment reference surfaces in contact with the vehicle body-side attachment portions at two or more combination positions each defined by a combination of one of lateral positions shifted from each other in a width direction of the main body and one of vertical positions shifted from each other in an attachment height direction of the main body to the vehicle body panel.

According to the aforementioned configuration, when external force in the width direction (direction orthogonal to the longitudinal direction) is applied to the vehicle exterior component, a plurality of imaginary center axes passing through the plurality of component-side attachment portions are formed. Moreover, the plurality of imaginary center axes vary in the positions in the width direction and the attachment height direction. Accordingly, the vehicle exterior component does not easily tilt. Thus, it is possible to provide a vehicle exterior component prevented from becoming loose against external force in the width direction as much as possible and the attachment structure for the same.

BRIEF DESCRIPTION OF DRAWINGS

FIG. 7B is a cross-sectional view along the line C-C of FIG. 7A with the roof rail according to the second embodiment attached to the roof panel.

FIG. 9A is a bottom view of a roof rail according to a third embodiment of the present invention.

FIG. 9C is a cross-sectional view along the line F-F of FIG. 9A with the roof rail according to the third embodiment attached to the roof panel.

DESCRIPTION OF EMBODIMENTS

Embodiments of the present invention are described below with reference to the drawings.

Figure 1:
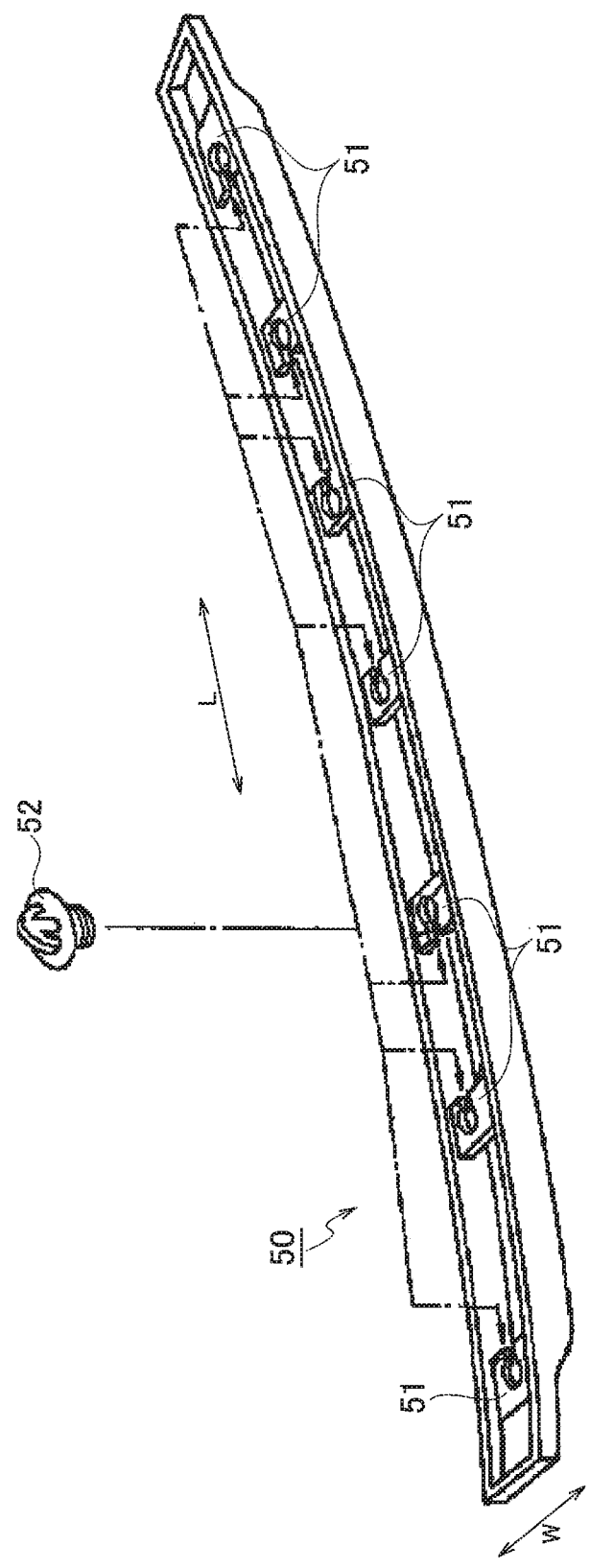
FIG. 1 is a bottom perspective view of a related roof rail.
Figure 2:
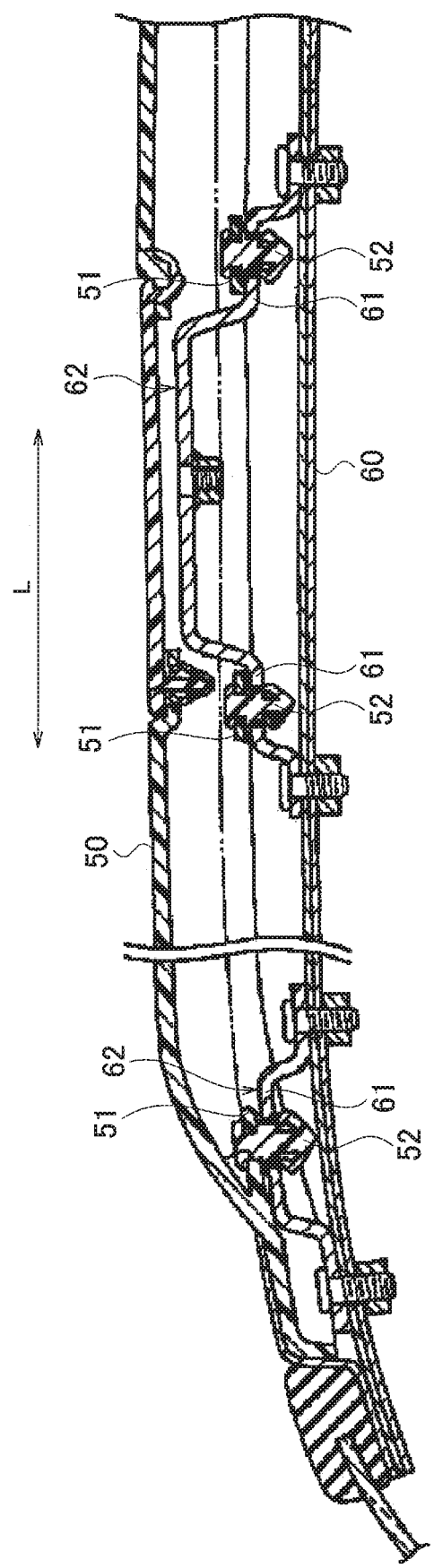
FIG. 2 is a cross-sectional view illustrating an attachment state of the related roof rail.
Figure 3:
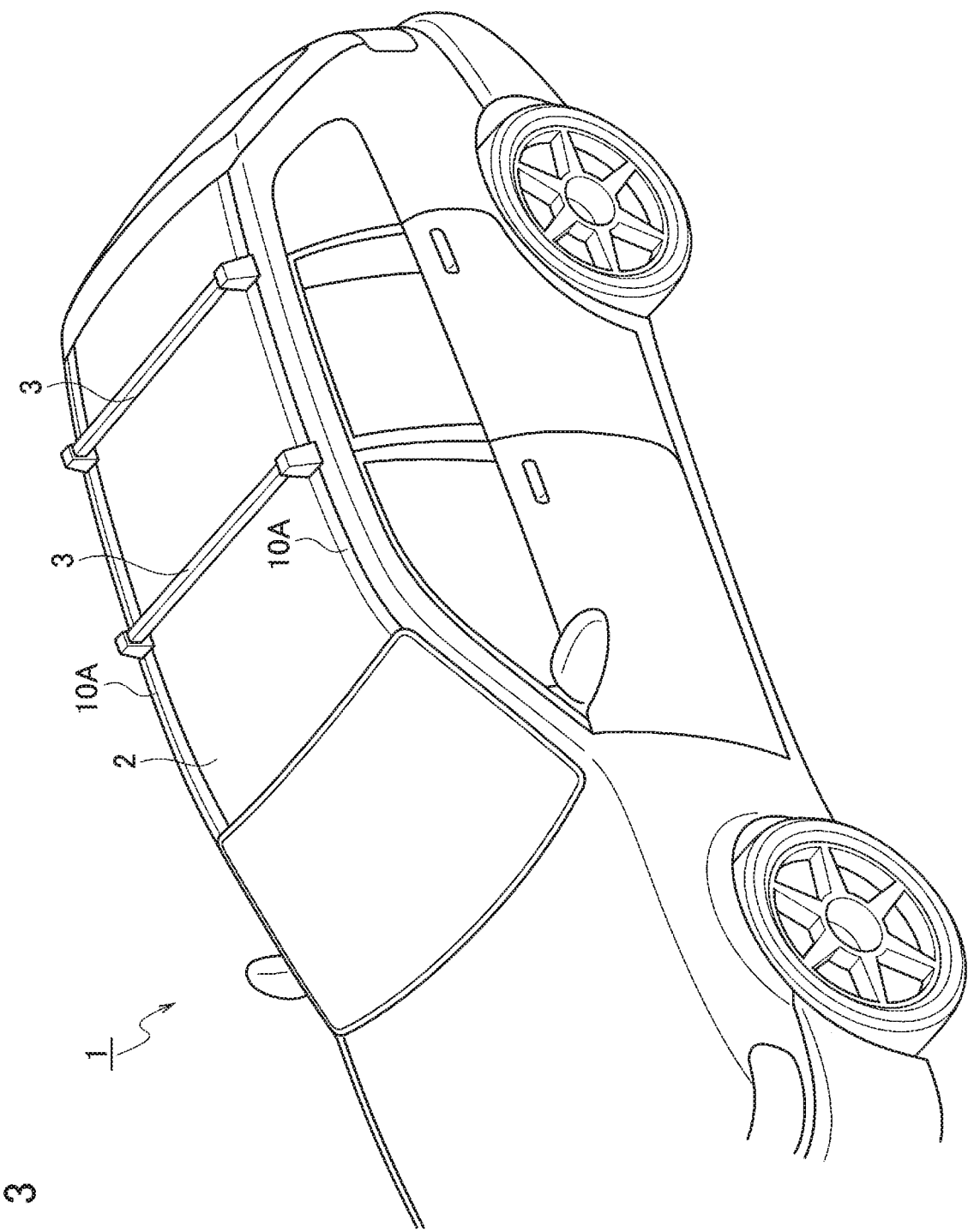
FIG. 3 is a schematic perspective view illustrating a roof rail according to a first embodiment of the present invention together with a vehicle.
Figure 4:
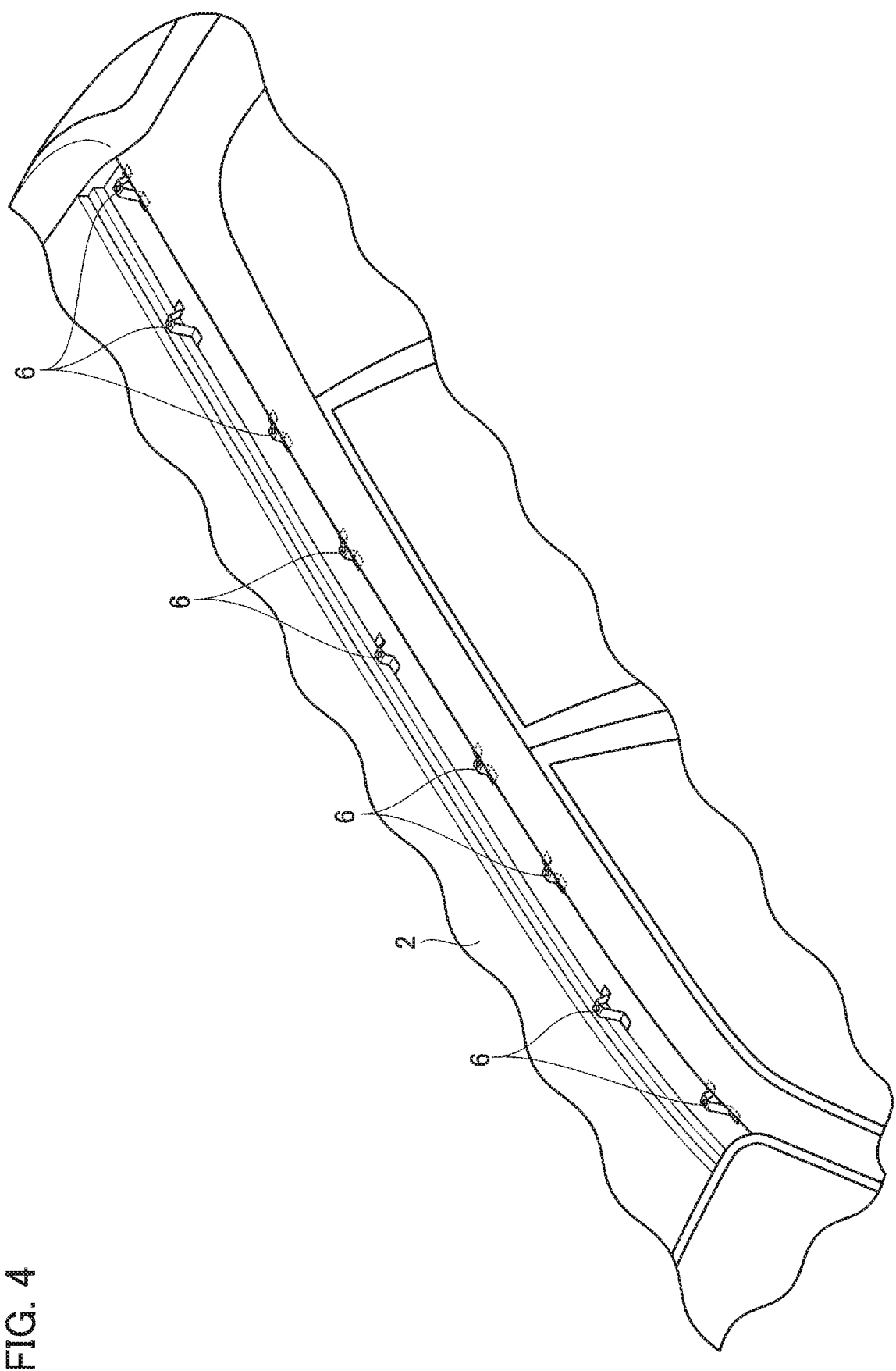
FIG. 4 is perspective view of a main portion of a roof panel where the roof rail according to the first embodiment is attached.

FIGS. 3 to 6 illustrate a first embodiment of the present invention. As illustrated in FIG. 3, paired roof rails 10A which are vehicle exterior components are attached to end portions, in a vehicle width direction, of a roof panel 2 which is a vehicle body panel of a vehicle body 1. Each roof rail 10A is arranged such that the longitudinal direction thereof extends in a vehicle front-rear direction. Paired cross bars 3 are attached to the roof panel 2 to extend from one roof rail 10A to another. A load can be placed on the roof panel 2 by utilizing these paired cross bars 3 and the like.

The configuration of the roof rails 10A and a structure for attaching the roof rails 10A to the roof panel 2 are described below. As illustrated in FIGS. 3 to 6, each roof rail 10A includes a roof rail main body 11 which is an elongated exterior component main body and rail-side attachment portions 12A to 12D which are multiple component-side attachment portions provided on a back surface (bottom surface) of the roof rail main body 11 at intervals in the longitudinal direction.

The shape of the cross-section of the roof rail main body 11 in a width direction W is substantially an arc shape (see FIG. 6) and both end portions of the roof rail main body 11 in the width direction come into contact with the roof panel 2 via an elastic sheet 4 in a state where the roof rail 10A is attached to the roof panel 2. Cross bar attachment step portions 13 one step lower than other portions are provided in the roof rail main body 11. Openings 13a are provided in the cross bar attachment step portions 13. The cross bars 3 are attached to the roof panel 2 by utilizing these openings 13a.

Clip attachment holes 15a are provided in the respective rail-side attachment portions 12A to 12D. Clips 15 (illustrated in FIGS. 5B and 5C) are fitted to the respective rail-side attachment portions 12A to 12D by utilizing the clip fitting holes 15a. Surfaces of the rail-side attachment portions 12A to 12D are referred to as attachment reference surfaces 12a (illustrated in FIG. 5A). The attachment reference surfaces 12a are surfaces which come into contact with vehicle body-side attachment portions 6 in a state where the roof rail 10A is attached to the roof panel 2.

The multiple rail-side attachment portions 12A to 12D have the attachment reference surfaces 12a located at two or more combination positions which are each defined by a combination of one of multiple lateral positions shifted from each other in the width direction W (direction orthogonal to the longitudinal direction L) of the roof rail main body 11 and one of multiple vertical positions shifted from each other in an attachment height direction T of the roof rail main body 11 to the roof panel 2.

In the first embodiment, the multiple lateral positions are two positions of a first lateral position S1 on the outer side in the vehicle body width direction (position on the line A-A in FIG. 5A) and a second lateral position S2 on the inner side in the vehicle body width direction (position on the line B-B of FIG. 5A) and the multiple vertical positions are two positions of a first vertical position H1 lower in the attachment height direction T (height from the roof panel 2) and a second vertical position H2 higher in the attachment height direction T. Moreover, the multiple rail-side attachment portions 12A to 12D have the attachment reference surfaces 12a at all (four) possible combination positions defined by the two lateral positions S1, S2 and the two vertical positions H1, H2.

Specifically, the multiple rail-side attachment portions 12A to 12D are formed of the first rail-side attachment portion 12A which has the attachment reference surface 12a at a combination position defined by the first lateral position S1 and the first vertical position H1, the second rail-side attachment portion 12B which has the attachment reference surface 12a at a combination position defined by the first lateral position S1 and the second vertical position H2, the third rail-side attachment portion 12C which has the attachment reference surface 12a at a combination position defined by the second lateral position S2 and the first vertical position H1, and the fourth rail-side attachment portion 12D which has the attachment reference surface 12a at a combination position defined by the second lateral position S2 and the second vertical position H2.

Vehicle body-side attachment portions 6 are provided respectively at positions corresponding to the rail-side attachment portions 12A to 12D in the roof panel 2 of the vehicle body 1. Upper surfaces of the vehicle body-side attachment portions 6 are attachment reference surfaces. The vehicle body-side attachment portions 6 are provided at positions (positions in the width direction W of the vehicle body 1 and attachment height positions) corresponding to the attachment reference surfaces 12a of the first to fourth rail-side attachment portions 12A to 12D in the roof rail main body 11. Clip fitting holes (not denoted by reference numerals) are provided in the vehicle body-side attachment portions 6.

The roof rail 10A is attached to the roof panel 2 by aligning the rail-side attachment portions 12A to 12D of the roof rail main body 11 with the vehicle body-side attachment portions 6 of the roof panel 2 and fitting the clips 15 to the vehicle body-side attachment portions 6.

As described above, the roof rail 10A includes the elongated roof rail main body 11 and the multiple rail-side attachment portions 12A to 12D provided at intervals in the longitudinal direction of the roof rail main body 11 and the multiple rail-side attachment portions 12A to 12D have the four attachment reference surfaces 12a at all the possible combination positions of the two lateral positions S1, S2 shifted from each other in the width direction W of the roof rail main body 11 and the two vertical positions H1, H2 shifted from each other in the attachment height direction T of the roof rail main body 11.

Figure 6:
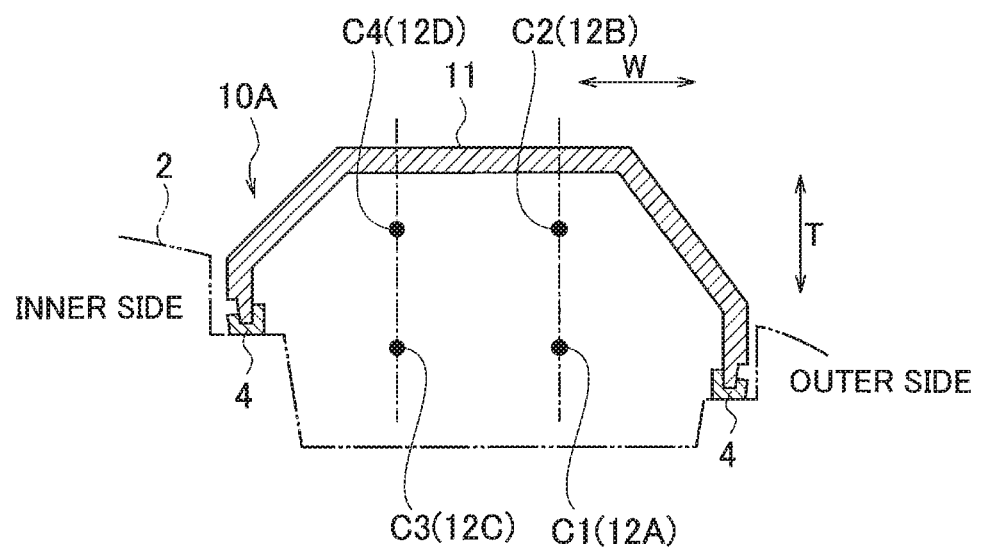
FIG. 6 is a schematic view explaining imaginary center axes as viewed in a width direction of the roof rail according to the first embodiment.

Accordingly, when external force is applied to the roof rail 10A in the width direction W (direction orthogonal to the longitudinal direction L), as illustrated in FIG. 6, the roof rail 10A has four imaginary center axes C1, C2, C3, C4 passing through the first to fourth rail-side attachment portions 12A to 12D as supporting axes for swinging (rotation). In addition, since the four imaginary center axes C1, C2, C3, C4 vary in the positions in the width direction W and the attachment height direction T, the roof rail 10A does not easily tilt and can be prevented from becoming loose.

Figure 7A:
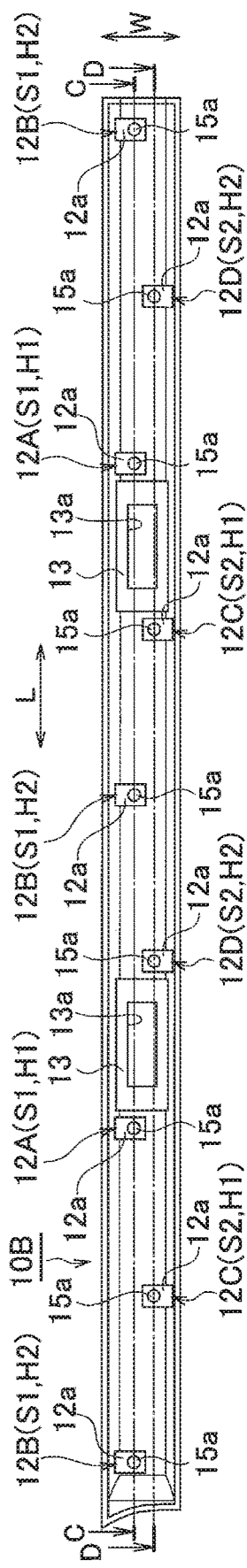
FIG. 7A is a bottom view of a roof rail according to a second embodiment of the present invention.
Figure 7C:
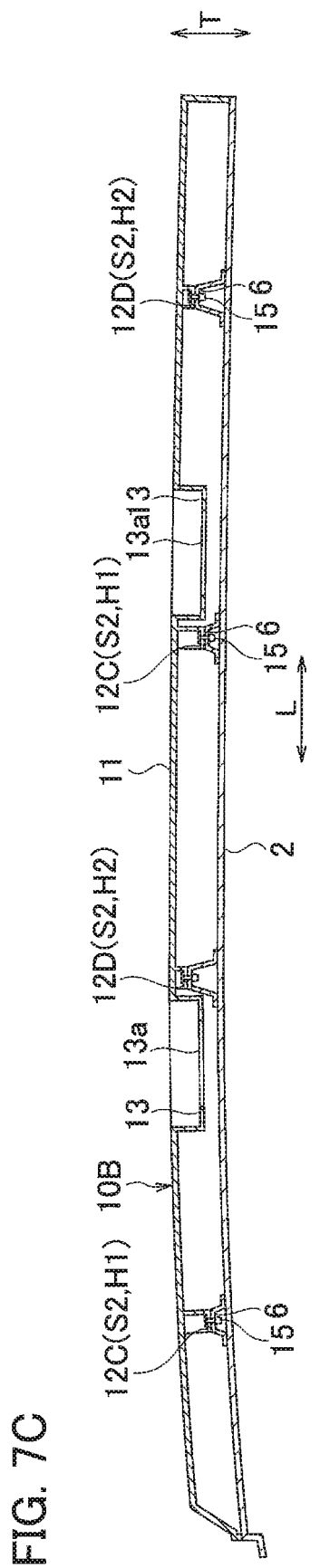
FIG. 7C is a cross-sectional view along the line D-D of FIG. 7A with the roof rail according to the second embodiment attached to the roof panel.
Figure 8:
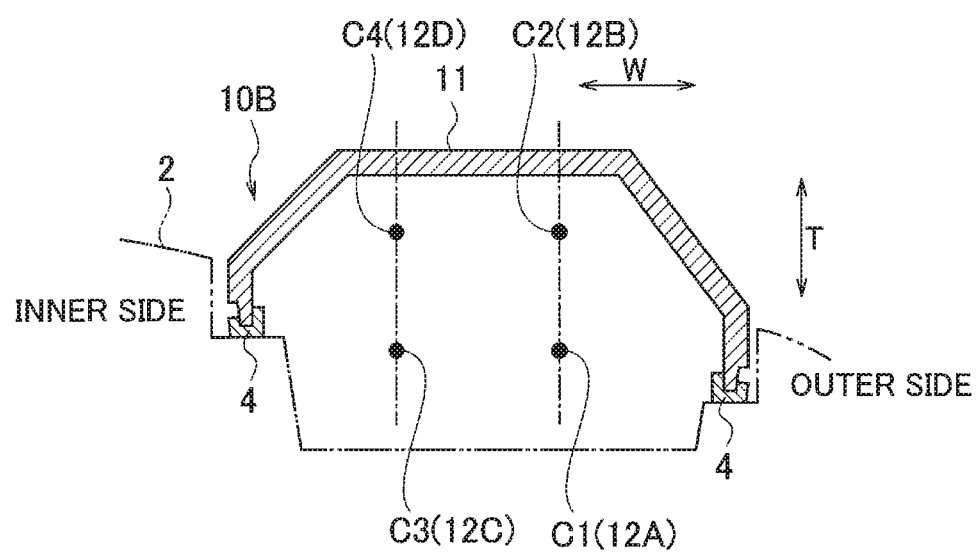
FIG. 8 is a schematic view explaining imaginary center axes as viewed in a width direction of the roof rail according to the second embodiment.

FIGS. 7A to 8 illustrate a second embodiment of the present invention. In the second embodiment, as in the first embodiment, the multiple rail-side attachment portions 12A to 12D have the four attachment reference surfaces 12a (illustrated in FIG. 7A) at all the possible combination positions of the two lateral positions S1, S2 shifted from each other in the width direction W of the roof rail main body 11 and the two vertical positions H1, H2 shifted from each other in the attachment height direction T of the roof rail main body 11. However, the second embodiment is different from the first embodiment in the arrangement of the first to fourth rail-side attachment portions 12A to 12D in a roof rail 10B and the corresponding vehicle body-side attachment portions 6 on the roof panel.

In the second embodiment, the rail-side attachment portions 12A to 12D are arranged such that any arrangement pattern including a group of the single first rail-side attachment portion 12A, the single second rail-side attachment portion 12B, the single third rail-side attachment portion 12C, and the single fourth rail-side attachment portion 12D is repeatedly arranged. In other words, each of the rail-side attachment portions 12A to 12D is arranged only at every fourth place.

Specifically, as illustrated in FIGS. 7A to 7C, the rail-side attachment portions 12 are arranged in a pattern repeating a group of the second rail-side attachment portion 12B, the third rail-side attachment portion 12C, the first rail-side attachment portion 12A, and the fourth rail-side attachment portion 12D arranged in this order in the longitudinal direction L of the roof rail 10B. In this arrangement, the first to fourth rail-side attachment portions 12A to 12D are arranged to be alternately shifted (zigzagging) in the width direction W. The first rail-side attachment portion 12A and the second rail-side attachment portion 12B located at the lateral position S1 are arranged alternately and the attachment reference surfaces 12a thereof are thereby arranged to be alternately shifted (zigzagging) in the height direction. Moreover, the third rail-side attachment portion 12C and the fourth rail-side attachment portion 12D located at the lateral position S2 are arranged alternately and the attachment reference surfaces 12a thereof are thereby arranged to be alternately shifted (zigzagging) in the height direction.

Portions with the same configurations as those in the first embodiment are denoted by the same reference numerals in the drawings and description thereof is omitted.

In the second embodiment, the rail-side attachment portions 12 are arranged such that any arrangement pattern including a group of the first rail-side attachment portion 12A to the fourth rail-side attachment portion 12D is repeated. Accordingly, as illustrated in FIG. 8, four imaginary center axes C1, C2, C3, C4 varying in the positions in the width direction W and the attachment height direction T are formed in a small area in which the first rail-side attachment portion 12A to the fourth rail-side attachment portion 12D are arranged in a certain way. Thus, it is possible to surely prevent tilting and partial loosening of the roof rail 10B which may occur in the small area (part of the roof rail 10B) due to external force in the width direction W (direction orthogonal to the longitudinal direction L).

Moreover, since the position of each attachment reference surface 12a in the width direction W or the attachment height direction T is always different from that of the attachment reference surface 12a adjacent in the longitudinal direction of the roof rail 10B, the roof rail 10B has a structure very strong against external force in the width direction W (direction orthogonal to the longitudinal direction).

Figure 9B:
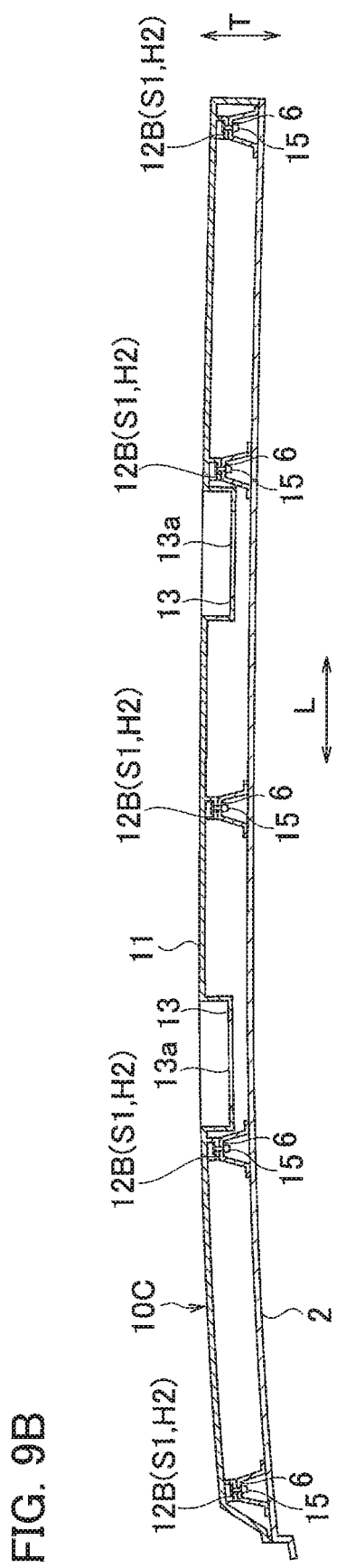
FIG. 9B is a cross-sectional view along the line E-E of FIG. 9A with the roof rail according to the third embodiment attached to the roof panel.
Figure 10:
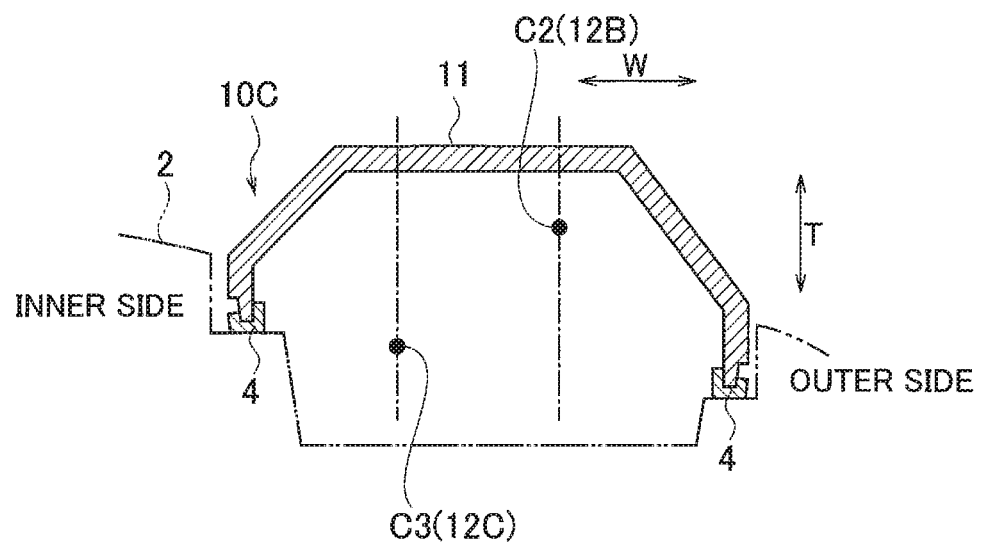
FIG. 10 is a schematic view explaining imaginary center axes as viewed in a width direction of the roof rail according to the third embodiment.

FIGS. 9A to 10 illustrate a third embodiment of the present invention. The third embodiment is different from the first and second embodiments in arrangement of the rail-side attachment portions 12B, 12C in a roof rail 10C and the corresponding vehicle body-side attachment portions 6 on the roof panel 2.

In the third embodiment, the roof rail 10C has multiple rail-side attachment portions 12B, 12C. However, the multiple rail-side attachment portions 12B, 12C include only two types of rail-side attachment portions which are the second rail-side attachment portion 12B and the third rail-side attachment portion 12C described in the first and second embodiments. Specifically, the attachment reference surfaces 12a (illustrated in FIG. 9A) are located at two of the combination positions of the two lateral positions S1, S2 shifted from each other in the width direction W of the roof rail main body 11 and the two vertical positions H1, H2 shifted from each other in the attachment height direction T of the roof rail main body 11 to the roof panel 2. Moreover, the second rail-side attachment portion 12B and the third rail-side attachment portion 12C are arranged alternately (in a zigzag pattern) in the longitudinal direction L of the roof rail 10C.

Portions with the same configurations as those in the first embodiment are denoted by the same reference numerals in the drawings and description thereof is omitted.

In the third embodiment, as illustrated in FIG. 10, the two imaginary center axes C2, C3 varying in the position in the width direction W and the attachment height direction T of the roof rail 10C are formed. Thus, it is harder to tilt the roof rail 10C by external force applied to the roof rail 10C in the width direction W (direction orthogonal to the longitudinal direction L) than in the case where the rail-side attachment portions are provided at two positions shifted from each other in the width direction W and in the case where the rail-side attachment portions are provided at two positions shifted from each other in the attachment height direction T, and the loosening of the roof rail 10C can be prevented.

Figure 5A:
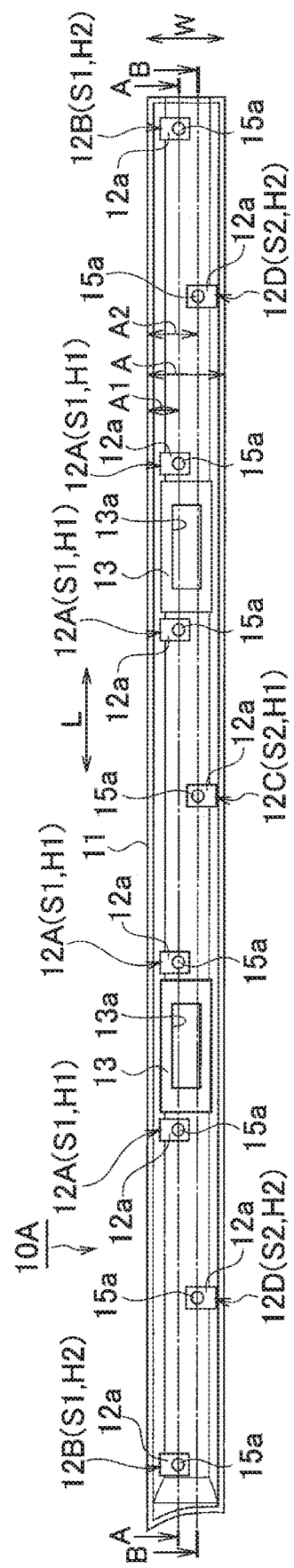
FIG. 5A is a bottom view of the roof rail according to the first embodiment.
Figure 5B:
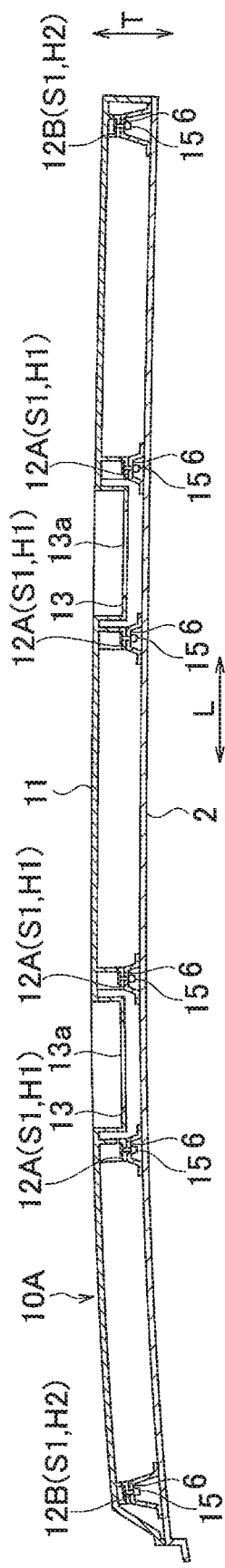
FIG. 5B is a cross-sectional view along the line A-A in FIG. 5A with the roof rail according to the first embodiment attached to the roof panel.
Figure 5C:
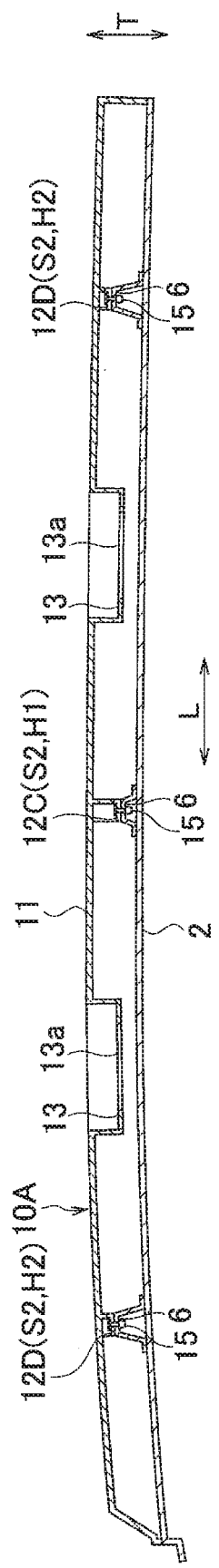
FIG. 5C is a cross-sectional view along the line B-B in FIG. 5A with the roof rail according to the first embodiment attached to the roof panel.

In the aforementioned embodiments, the roof rails 10A to 10C have linear shapes in the longitudinal direction but may have curved shapes in some cases. When the roof rails 10A to 10C have curved shapes, the positions shifted from each other in the width direction W (direction orthogonal to the longitudinal direction L) refers to different positions relative to the entire width A of the roof rail main body 11 (such positions that a value of A1/A and a value A2/A are different) as illustrated in FIG. 5A.

The multiple rail-side attachment portions 12A to 12D may be configured such that the attachment reference surfaces 12a are located at multiple combination positions which are each defined by a combination of one of three or more lateral positions shifted from one another in the width direction W of the roof rail main body 11 and one of three or more vertical positions shifted from one another in the attachment height direction T of the roof rail main body 11 to the roof panel 2 and the attachment reference surfaces 12a are located at all possible combination positions of the lateral positions and the vertical positions.

Although the vehicle exterior components are the roof rails 10A to 10C in the aforementioned embodiments, the present invention can be applied to any elongated vehicle exterior component.

Although the rail-side attachment portions 12A to 12D are attached to the vehicle body by using the clips 15 in the aforementioned embodiments, any means which can attach the rail-side attachment portions 12A to 12D to the vehicle body can be used. For example, the rail-side attachment portions 12A to 12D may be attached to the vehicle body by using screws or both of screws and clips.

The present invention is not limited to the aforementioned embodiments as they are and the elements can be implemented while being modified in a stage of actually carrying out the invention, within a scope not departing from the spirit of the invention. Moreover, various inventions can be formed by appropriately combining the multiple elements disclosed in the aforementioned embodiments. For example, some elements among all elements described in the embodiments may be deleted.

The invention claimed is:

1. A vehicle exterior component comprising:
a main body having an elongated shape and attached to a vehicle body panel having vehicle body-side attachment members; and
attachment portions provided in the main body at intervals in a longitudinal direction of the main body and having attachment reference surfaces in contact with the vehicle body-side attachment members at two or more combination positions,
wherein the combination positions include:
a first combination position defined by a first lateral position and a first vertical position;
a second combination position defined by the first lateral position and a second vertical position;
a third combination position defined by a second lateral position and the first vertical position; and
a fourth combination position defined by the second lateral position and the second vertical position,
wherein the first lateral position and the second lateral position are offset from each other in a width direction of the main body, and the first vertical position and the second vertical position are offset from each other in the height direction of the main body.

2. The vehicle exterior component according to claim 1, wherein the attachment portions have the attachment reference surfaces at each of the first, second, third and fourth combination positions.

3. The vehicle exterior component according to claim 2, wherein
the attachment portions include:
a first attachment portion having the attachment reference surface at the first combination position;
a second attachment portion having the attachment reference surface at the second combination position;
a third attachment portion having the attachment reference surface at the third combination position; and
a fourth attachment portion having the attachment reference surface at the fourth combination position.

4. The vehicle exterior component according to claim 3, wherein the attachment portions are arranged in the longitudinal direction with an arrangement pattern including a group of a single one of each of the first attachment portion, the second attachment portion, the third attachment portion, and the fourth attachment portion, the group being repeated.

5. The vehicle exterior component according to claim 1, wherein the attachment portions have the attachment reference surfaces at four or more of the first, second, third and fourth combination positions.

6. The vehicle exterior component according to claim 1, wherein the vehicle exterior component is a vehicle roof rail.

7. An attachment structure of a vehicle exterior component, comprising:
a vehicle body panel having vehicle body-side attachment members; and
the vehicle exterior component according to claim 1 attached to the vehicle body panel.

8. The attachment structure according to claim 7, wherein the attachment portions have the attachment reference surfaces at each of the first, second, third and fourth combination positions.

9. The attachment structure according to claim 8, wherein
the attachment portions include:
a first attachment portion having the attachment reference surface at the first combination position;
a second attachment portion having the attachment reference surface at the second combination position;
a third attachment portion having the attachment reference surface at the third combination position; and
a fourth attachment portion having the attachment reference surface at the fourth combination position.

10. The attachment structure according to claim 9, wherein the attachment portions are arranged in the longitudinal direction with an arrangement pattern including a group of a single one of each of the first attachment portion, the second attachment portion, the third attachment portion, and the fourth attachment portion being repeated.

11. The attachment structure according to claim 7, wherein the attachment portions have the attachment reference surfaces at four or more of the first, second, third and fourth combination positions.

12. The attachment structure according to claim 7, wherein the vehicle exterior component is a vehicle roof rail.

* * * * *